Jan. 27, 1931.  W. J. BAKER  1,790,195
HANDLE STRUCTURE FOR CHILDREN'S VEHICLES
Filed July 26, 1926
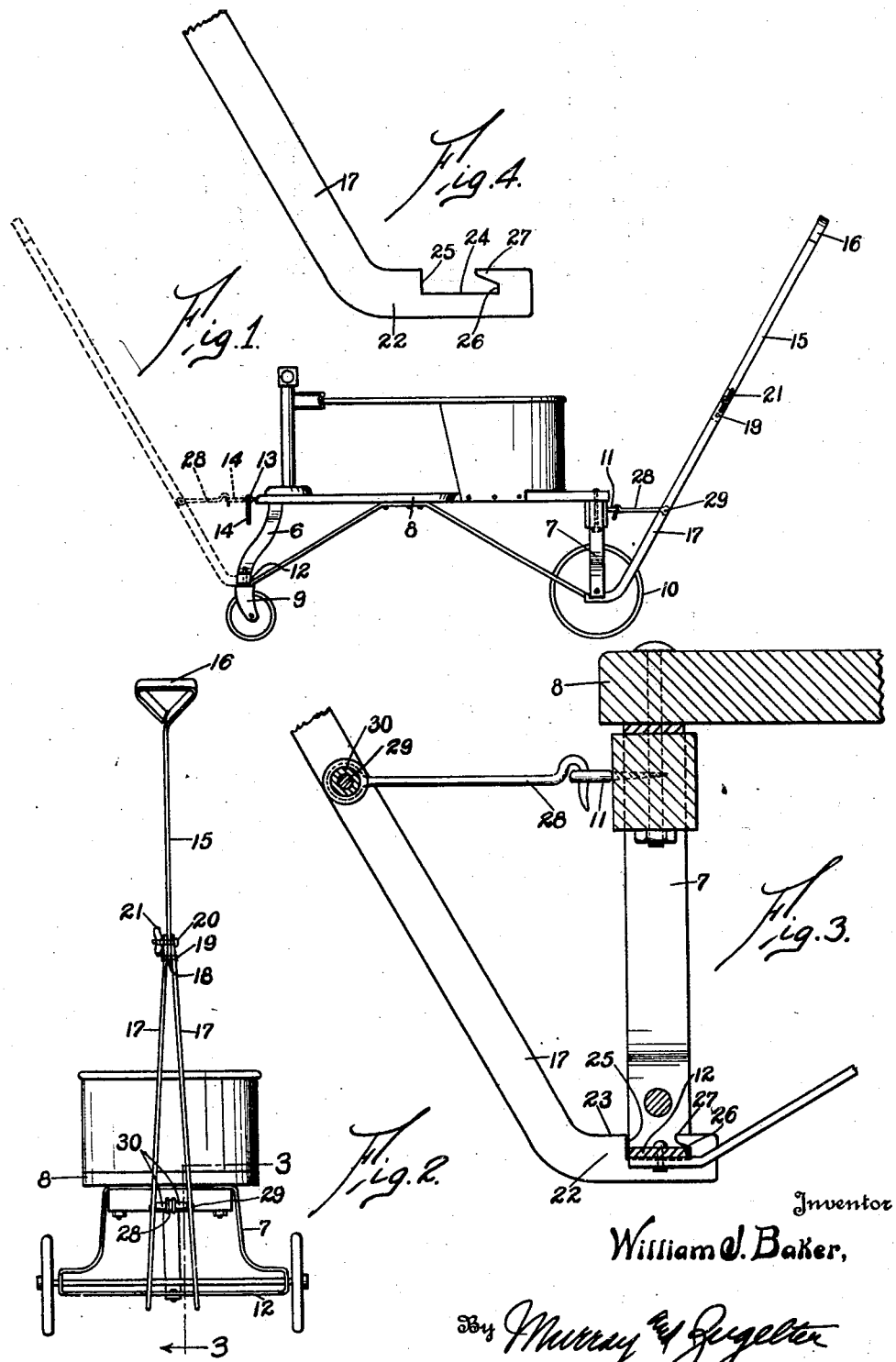

Patented Jan. 27, 1931

1,790,195

UNITED STATES PATENT OFFICE

WILLIAM J. BAKER, OF NEWPORT, KENTUCKY

HANDLE STRUCTURE FOR CHILDREN'S VEHICLES

Application filed July 26, 1926. Serial No. 124,881.

This invention relates to children's vehicles, particularly to detachable handle means therefor, and has for an object the provision of a foldable handle member which may be attached and detached to and from a vehicle in a minimum of time.

Another object is to provide such a handle means which is simple and inexpensive of manufacture.

Another object is to provide a simple and effective means for rigidly attaching the handle to the vehicle.

These and other objects are attained by the means described herein and disclosed in the accompanying drawings, in which:

Fig. 1 is a side elevational view of a child's vehicle having attached thereto at the rear a handle structure of my invention, said handle member also being shown in dotted lines in its operative position at the front of the vehicle.

Fig. 2 is an end elevational view of the device shown in Fig. 1.

Fig. 3 is a cross sectional view taken on line 3—3 of Fig. 2.

Fig. 4 is a fragmental view of a part of the device of my invention.

In the present embodiment the device of my invention is shown in connection with a child's vehicle of the type wherein strip metal is employed for forming the front and rear support members 6 and 7 which are attached to a vehicle seat or body member 8.

The support members 6 and 7 may be of continuous strips and comprise upright portions attached to the body and transverse members 12 to which are connected the front and rear wheels or casters and wheels 9 and 10. The strip metal forming the support members is usually rectangular in cross section. At the rear end of the body 8 is mounted a loop or screw eye 11. At the front end of the vehicle where the transverse portion 12 of support 6 is forwardly offset from the front end of the vehicle, a screw eye 13 having a link 14 used therewith is attached to the body. These simple parts remain permanently attached to the vehicle.

When it is desired that the vehicle be converted into a form of go-cart the handle structure of my invention is simply and expeditiously attached. As shown in Fig. 2, the handle member comprises a rod 15 provided at one end with a handle 16 which may be inexpensively provided by turning the rod 15 upon itself to form a loop member. A pair of arms 17 are pivotally mounted on opposite sides of rod 15 and adjacent the end 18 by means of a suitable pivot 19. From the foregoing it will be apparent that the arms and rod may be folded together by turning them about the pivot 19. In order to rigidly secure arms 17 to rod 15, aligned perforations are provided in the overlapping portions of said members for receiving a removable bolt 20 which receives a suitable wing nut 21. When thus secured together the portions form a single rigid forked member. The arms 17 are turned at an angle adjacent the free ends and the turned end portions 22 have formed in their upper edges aligned slots 24 providing shoulders 25 and 26 so spaced as to snugly receive the transverse portion 12 of either support member. A finger or hook 27 overhangs each slot 24 and engages the top of transverse member 12 when such member is properly seated in the slots. The relation of fingers 27 and the mouths of the slots 24 is such as to permit the end portion 22 of each arm 17 to be hooked on the transverse member 12. This hooking together and also the separation of the parts is accomplished by tilting the arms 17 at such angle to the member 12 as to permit said member to enter the slots obliquely and edgewise. The arms are then raised to the position shown in Fig. 3 whereupon the parts are snugly hooked together. A hook 28 is pivotally mounted between the arms 17 on a pin 29. Suitable flanged collars 30 on pin 29 serve to space the arms 17 and also to retain the hook 28 centrally between them. The hook is adapted to engage with the eye 11, thereby precluding tilting of the handle structure so that it cannot be accidentally detached from the transverse member 12.

The link 14 at the forward end of the vehicle compensates for the offset distance between the front end of the body and the forward transverse member 12 so that when the handle structure is used with the front transverse member, the hook 28 may be connected to the link, as shown in dotted lines at the left of Fig. 1.

The handle member is effective for controlling a vehicle because of its association therewith in proximity of the axis of rotation of the wheels and casters. The connection between the handle structure and vehicle is rigid and permits lifting of the vehicle through the agency of the handle.

The operation of the device will be readily understood. When the handle is removed the vehicle may be used by the child in the well known manner of foot propulsion. The handle may be folded and stored away by removing the thumb nut 21 and bolt 20. When it is desired to convert the vehicle into a cart which is to be drawn by an attendant, the arms 17 are secured rigidly to the rod 15 by means of the bolt and wing nut, whereupon the end portions 22 of the arms are passed beneath front transverse member 12 for seating said member in the slots, whereupon the hook 28 is connected to link 14. When it is desired to arrange the handle for pushing the vehicle, the handle is used with the rear transverse member 12 and hook 28 is connected to eye 11.

What I claim is:

1. In combination a child's vehicle having a flat transverse support member, a handle member having a pair of arms, each of said arms having a slot providing a pair of shoulders, the transverse member being adapted to enter the slots with the shoulders abutting opposite sides thereof, a finger on one of said shoulders adapted to overhang the flat transverse member to preclude downward movement of the arm from the transverse member and means to prevent relative displacement of the said transverse member, said shoulders and said finger.

2. A detachable handle for a child's vehicle having a flat transverse support member, said handle having a portion to be grasped and comprising permanently and rigidly spaced arms each having an open mouthed cut away portion for receiving the flat transverse support member, opposed abutments in the cut away portions of the arms for abutting the support member, and a finger on each arm, said fingers overhanging the flat transverse support member and the cut away portions of the arms and extending substantially in the direction of the portion to be grasped for cooperating with the flat transverse member whereby to limit upward movement of the handle relative to the vehicle.

3. A detachable handle for a child's vehicle having a flat transverse support member, said handle having a portion to be grasped and comprising permanently and rigidly spaced arms each having an open mouthed cut away portion for receiving the flat transverse support member, opposed abutments in the cut away portions of the arms for abutting the support member, a finger on each arm, said fingers overhanging the cut away portions of the arms and extending substantially in the direction of the portion to be grasped, and means for retaining the arms in position relative to the transverse member.

4. A detachable handle for a child's vehicle having a flat transverse support member, said handle having on one end a portion to be grasped and comprising spaced arms each having an open mouthed cut away portion for receiving the flat transverse support member, a finger on each arm, said fingers overhanging the cut away portions of the arms and serving to retain the transverse support member within the cut away portions, the fingers extending substantially in the direction of the portion to be grasped.

5. A detachable handle for a child's vehicle having a flat transverse support member, said handle having on one end a portion to be grasped and comprising spaced arms each having an open mouthed cut away portion for receiving the flat transverse support member, a finger on each arm, said fingers overhanging the cut away portions of the arms and extending substantially in the direction of the portion to be grasped, and means for holding the handle in elevated position relative to the vehicle.

6. A detachable handle for a child's vehicle having a flat transverse support member, said handle having on one end a portion to be grasped and comprising spaced arms each having an open mouthed cut away portion for receiving the flat transverse support member, opposed abutments in the cut away portions of the arms for abutting the support member, and a finger on each arm, said fingers overhanging the cut away portions of the arms and extending substantially in the direction of the portion to be grasped.

7. A detachable handle for a child's vehicle comprising a portion to be grasped while moving the vehicle and a pair of spaced arms, an end portion on each arm having an open mouthed cut away portion for reception of a part of the vehicle, and a finger on each end portion overhanging the cut away portion and partially closing the open mouth thereof, said finger being disposed so as to extend substantially in the direction of the portion to be grasped for moving the vehicle.

8. In combination a child's vehicle having a body, a flat transverse member on the body, and a readily detachable handle having spaced arms provided with fingers and notches for bodily receiving the flat transverse member and for limiting movement of the arms in one direction of rotation relative to the flat transverse member, and abutments on the arms for precluding movement of the arms laterally of the flat transverse member.

9. In combination a child's vehicle having a body, a flat transverse member on the body, and a readily detachable handle having spaced arms provided with fingers and notches for bodily receiving the flat transverse member and cooperating therewith for limiting movement of the arms in one direction of rotation relative to the flat transverse member, and disengageable means for holding the handle in the extreme position limited by the fingers and notches.

In testimony whereof, I have hereunto subscribed my name this 22nd day of July, 1926.

WILLIAM J. BAKER.